March 22, 1927.
L. GOODMAN
FLEXIBLE COUPLING
Filed May 29, 1926
1,621,980
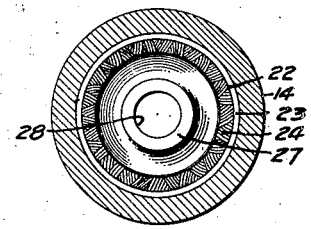
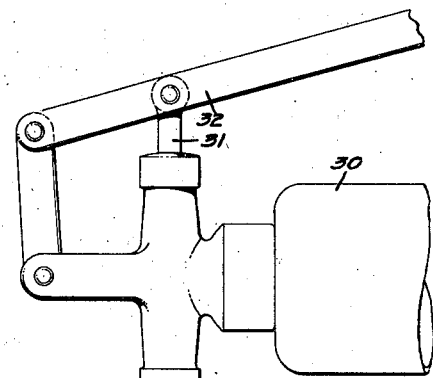
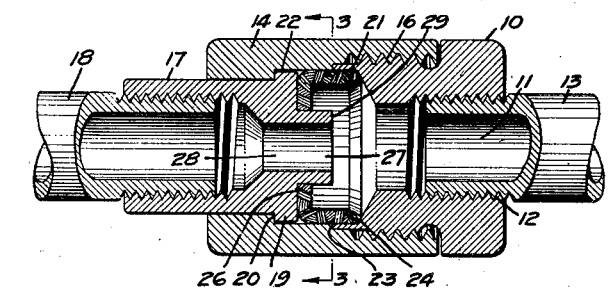
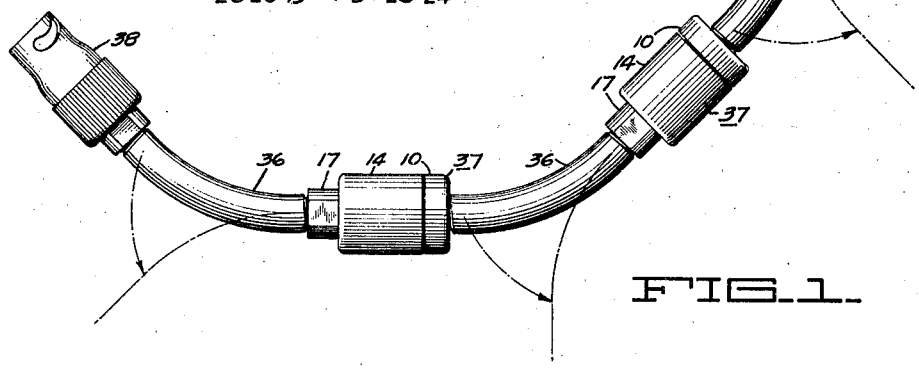
INVENTOR
Louis Goodman
BY
his ATTORNEYS Patented Mar. 22, 1927.

1,621,980

UNITED STATES PATENT OFFICE.

LOUIS GOODMAN, OF SAN FRANCISCO, CALIFORNIA.

FLEXIBLE COUPLING.

Application filed May 29, 1926. Serial No. 112,698.

This invention relates generally to flexible couplings adapted to be used in high pressure fluid systems.

Flexible couplings are commonly constructed of two or more members detachably secured together and having relatively movable inlet and outlet connections. Leakage is prevented by suitable packing or cup washers exposed to the internal pressure of the fluid being passed through the same. Prior couplings however have been expensive to manufacture because of the design of the detachable parts, and escape of fluid is not entirely obviated when in use. Furthermore, when a cup washer form of packing has been used it has been difficult to assemble the cup washer with the other parts of the coupling.

It is an object of this invention to devise a flexible coupling for conveying liquids at high pressure which will effectively prevent the escape of fluid and at the same time will be simple in construction and cheap to manufacture.

It is a further object of this invention to devise a flexible coupling in which the parts may be readily assembled together with the packing means.

Further objects of this invention will appear from the following description in which I have set forth the preferred embodiment of my invention. It is to be understood that the scope of the invention is to be determined from the appended claims and the state of the prior art.

Referring to the drawings:

Figure 1 illustrates the manner in which the device of this invention may be incorporated with the flexible hose of a high pressure grease gun.

Fig. 2 is a cross section showing the details of the flexible coupling of this invention.

Fig. 3 is a cross sectional view taken along the line 3—3 of Fig. 2.

The device comprises generally a body portion 10 provided with a central passageway 11 which may be internally threaded as at 12 for connection with a pipe 13, the pipe being in communication with a source of fluid at high pressure. Secured to the body portion 10 there is a ferrule 14 which is preferably provided with a threaded connection 16 for engagement with the body portion. The ferrule 14 is adapted to retain a nipple 17 which is connected to a suitable outlet pipe 18. The nipple 17 is rotatably retained within the ferrule 14 as by means of a flange 19 upon the inner end of the nipple engaging the shoulder 20 provided within the ferrule 14.

With the coupling as so far described it is obvious that leakage might occur at two points, the joint between the body portion and ferrule and the joint between the ferrule and nipple. To obviate such leakage the inner end of the body portion 10 is provided with a suitable counterbore 21 of substantially the same diameter as the bore 22 in the ferrule 14. The inner end of the body portion is also extended to form an abutting contact 23 with the ferrule 14 which is preferably located at a point spaced from the nipple. Positioned within the ferrule and body portion there is a suitable cup washer 24 which is preferably made L-shaped in cross section, one leg of the L being adapted to contact with the inner end 26 of the nipple while the other leg of the L is adapted to contact with the inner surface of the bore within the ferrule 14 and the counterbore within the body portion 10. Thus when the coupling is in use with fluid under high pressure, the pressure against the inner exposed face of the cup washer 24 will force the cup washer into sealing engagement with the inner end 26 of the nipple, the bore 22 and the counterbore 21 in the body portion, thus effectively sealing all coupling joints.

For aiding in positioning the cup washer 24 it is preferable to provide a collar 27 extending inwardly from the end of the nipple 17. This collar also serves a useful function in that it tends to deflect fluid into contact with the cup washer, thereby aiding in pressing the washer into tight sealing engagement. Thus a portion of the fluid passing through the coupling will strike the end 29 of the collar 27 and be deflected outwardly into contact with the inner surface of the cup washer. Furthermore, the fact that the passageway 28 in the nipple is smaller than the passageway 11 serves to augment this effect and aids in maintaining a sealed contact for the cup washer.

Figure 1 indicates how the coupling described above may be incorporated with a grease gun. A grease gun 30 of conventional type has been shown comprising a high pressure plunger 31 actuated by means of a hand lever 32. The outlet 33 for the gun is connected to a flexible hose 34 comprising in this instance a plurality of bent pipe sections 36 interconnected by a series of flexible couplings 37 constructed as described above. Because of the number of flexible couplings employed and because of the alined passageways in the same, the pipe sections 36 need only be bent upon a relatively small angle, say less than 45 degrees in order to secure universal movement of the fitting 38 provided at the end of the hose.

It will be obvious that the above coupling possesses many practical advantages not found in devices which have previously been constructed. For example, the body portion and ferrule are of simple construction and may be readily machined with ordinary automatic or lathe machinery. Insertion of the cup washer, which is a difficult operation with many couplings, is greatly simplified by providing the collar 27 and the counterbore 21. In assembling it is only necessary to first position the cup washer 24 upon the collar 27 of the nipple and then engage the free lip of the washer in the counterbore 21. The ferrule 14 is then slid over the nipple and cup washer and engaged with the body portion. Since the junction between the ferrule and body portion is effectively sealed by the cup washer it is not necessary to make a tight connection between these members.

I claim:

1. A flexible coupling comprising a hollow body portion having its inner end counterbored, a ferrule adapted to be secured to said body portion and having an inner bore of substantially the same diameter as said counterbore, a nipple rotatably retained by said ferrule, the inner end of said nipple being spaced from the junction between said bores, and a cup washer seated against the inner end of the nipple and extended past the junction between said bores whereby both the junctions between the ferrule and nipple, and ferrule and body portion, are sealed.

2. A flexible coupling comprising a body portion having a passageway through the same, a ferrule threaded upon said body portion, a nipple rotatably engaged by said ferrule, the inner end of said nipple having a collar spaced from the inner wall of the ferrule, an L-shaped cup washer positioned between said collar and ferrule, one leg of said L being seated upon the end of the nipple, and the other leg being seated against the inner wall of the ferrule and extended to seat in a counterbore provided in the inner end of the body portion.

3. A flexible coupling comprising a hollow body portion having its inner end counterbored, a ferrule adapted to be secured to said body portion and having an inner bore of substantially the same diameter as said counterbore, a nipple rotatably retained by said ferrule, the inner end of said nipple being spaced from the junction between said bores, a cup washer seated against the inner end of the nipple and extended past the junction between said bores whereby both the junctions between the ferrule and nipple, and nipple and body portion, are sealed, and a collar extended inwardly from said nipple, said washer being adapted to surround said collar.

In testimony whereof, I have hereunto set my hand.

LOUIS GOODMAN.